United States Patent

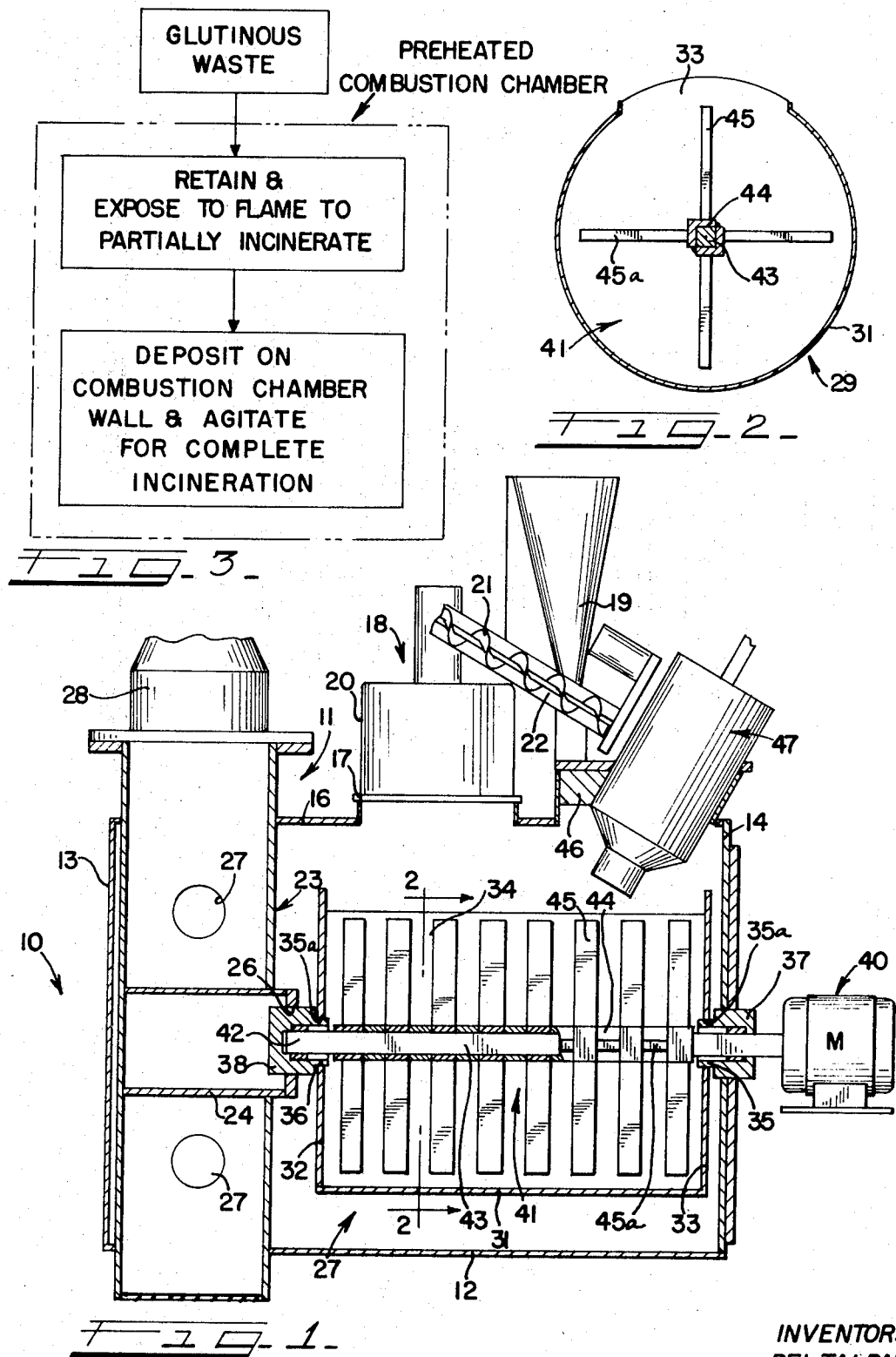

[11] 3,557,724

| [72] | Inventors | Pei Tai Pan;<br>John Michael Whalen, Beloit, Wis. |
|---|---|---|
| [21] | Appl. No. | 845,180 |
| [22] | Filed | July 28, 1969 |
| [45] | Patented | Jan. 26, 1971 |
| [73] | Assignee | Fairbanks Morse, Inc.<br>New York, N.Y.<br>a corporation of Delaware |

[54] INCINERATOR
8 Claims, 3 Drawing Figs.

| [52] | U.S. Cl. | 110/8 |
|---|---|---|
| [51] | Int. Cl. | F23g 5/12 |
| [50] | Field of Search | 110/7, 8, 14, 15, 18 |

[56] References Cited
UNITED STATES PATENTS

| 3,357,377 | 12/1967 | Stevens | 110/8 |
|---|---|---|---|
| 3,418,952 | 12/1968 | Meller et al. | 110/8 |

*Primary Examiner*—Kenneth W. Sprague
*Attorney*—Petherbridge, O'Neill & Lindgren

ABSTRACT: The method of burning glutinous waste mass in an incinerator wherein the glutinous mass is maintained out of contact with a preheated combustion chamber wall to raise the temperature of the mass and cause partial incineration of the mass and thereby prevent the creation of thermal gradients in the combustion chamber wall. The partially incinerated mass deposited on the wall is then burned to convert the waste to ash. The glutinous waste mass is fed into the furnace at a rate commensurate with the burning rate.

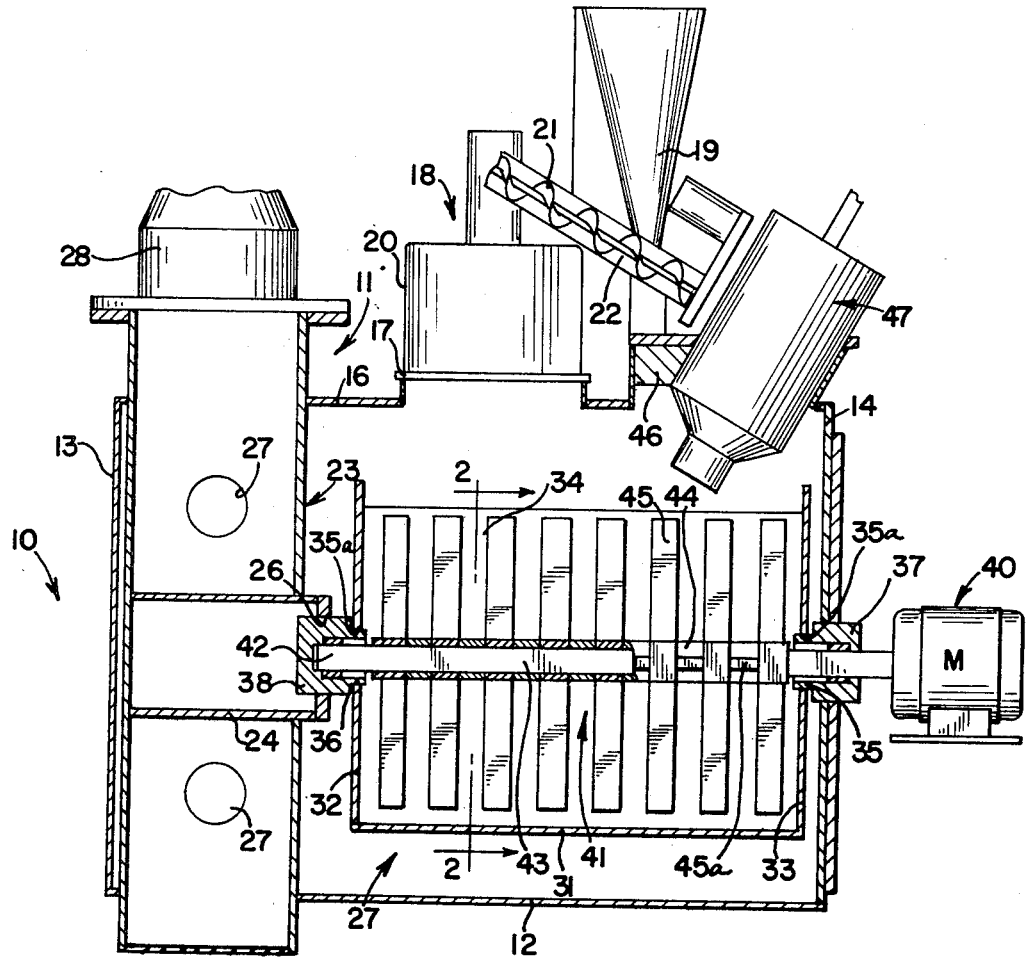

3,557,724

INCINERATOR

The present invention relates to methods for destroying, by incineration, sewage solids, garbage, or industrial waste requiring limited waste treatment applications, such as in individual homes, office and industrial buildings, military installations and ships. More particularly the present invention relates to an improved method of incinerating the waste solids to reduce the solids to ash.

Heretofore, human waste solids have been incinerated in a self-contained incinerating toilet in which the wastes are deposited directly in the toilet. A disadvantage of disposing waste in this manner resides in the excessive heat which is created after continuous or prolonged use. A further disadvantage of this prior method is the inability to achieve complete combustion of the fumes which are objectionable and under some circumstances hazardous.

U.S. Pat. No. 3,418,952 discloses an incinerator which overcomes many of the difficulties and problems encountered heretofore. In this incinerator a given volume of wet sludge or waste is directly deposited into a fire box or combustion chamber at ambient temperature. The combustion chamber temperature is then raised by exposure to a burner flame during which time the sludge is reduced to ash.

The foregoing incinerator is thus primarily a time-temperature operation so that either a prescribed time-temperature table must be utilized to determine when combustion is complete or the combustion must be periodically observed to prevent runaway combustion.

Moreover, this prior incineration method results in a deleterious effect on the combustion box because of the characteristics of the waste sludge. The waste sludge contains as much as 90 percent water by weight and is of a glutinous nature and collects in pile or mass. When placed under a flame a crust forms on the outer surface of the mass and thereby inhibits the drying and burning of the underlying material.

When material in this partially wet condition is deposited in a sizeable quantity on the metal plate of combustion chamber wall at ambient temperature and then subjected to a high temperature flame, large thermal gradient is produced in the plate. The thermal gradient occurs because the area of the plate contacted by the wet solids remains at a comparatively low temperature while the uncovered area subjected directly to the flame is heated to a much higher temperature. The thermal gradient creates thermal stresses which permanently deform the combustion wall plate and cause ultimate failure thereof, thereby to shorten the useful operating life of the incinerator.

It is the primary object of this present invention to provide a method for incinerating waste sludge of a glutinous nature which overcomes the difficulties encountered heretofore.

It is a further object to provide a method for incinerating waste sludge of a glutinous nature which is solely a time dependent function of the burning rate of the waste sludge.

It is still a further object to provide a method for incinerating waste sludge of a glutinous nature wherein the sludge is partially incinerated prior to being deposited on the combustion chamber wall.

It is another object to provide a method for incinerating waste of a glutinous nature wherein said waste is rotated and agitated in the presence of a combustion temperature to partially incinerate the same prior to being deposited on the combustion chamber wall.

It is still another object to provide a method for incinerating glutinous waste in accordance with the immediately foregoing object wherein the partially incinerated waste deposited on the combustion chamber wall is simultaneously agitated with the glutinous waste maintained out of contact with the wall and wherein the glutinous waste is continuously fed to said combustion temperature at a rate dependent on the burning rate of said waste.

The foregoing object and other objects of the present invention which will be readily apparent from the following specification, drawings and appended claims are accomplished generally by preheating the combustion chamber to the combustion temperature prior to feeding the wet sludge waste therein. The wet sludge waste is then fed into the combustion chamber at a controlled rate and rotated and agitated in the presence of the combustion chamber heat prior to being deposited on the combustion chamber wall to raise the temperature and partially incinerate the sludge. The partially incinerated sludge is then deposited on the combustion wall for complete incineration to ash.

In the drawings:

FIG. 1 is a vertical sectional view of an incinerator unit constructed to practice the method of the present invention;

FIG. 2 is a partial vertical sectional view taken generally along the lines 22 of FIG. 1; and FIG. 3 is a flow diagram setting forth the steps for carrying out the method of the present invention.

Referring now to the drawings, the incinerator unit 10 which may be used in carrying out the present invention comprises an inner shell or housing 11 having a bottom wall 12, a rear end insulated wall 13, a front insulated wall 14 and a top wall 16. The inner housing may be suitably covered by a detachable shroud, not shown.

Mounted on the top wall 16 over an opening is a sludge or waste transfer device 18 which serves to feed the waste into the housing 11. The waste transfer device 18 includes an entry hopper 19 which serves as a waste storage container. The wet waste which is of a glutinous nature and in bulk form is transferred from the hopper 19 to an inlet tube 20 via a feed auger 21 disposed in a feed tube 22. The feed auger is powered by a variable speed drive, not shown, to control the rate at which the waste is introduced into the incinerator 10.

The shell or housing 11 is formed as a weldment and includes an exhaust stack 23 of substantially circular cross section. Horizontally extending through the stack 23 is a bearing support structure 24 having an opening 26 at the inboard end thereof. Vertically spaced and disposed on opposite sides of the bearing support structure 24 are circular openings 27. The circular opening 27 serves to provide passages for the exhaust gases from the interior of the housing 11 into the exhaust stack 23. The openings 27 are located so as to draw the jet exhaust gases through practically the entire length of the stack 23 and thereby maintain a substantially uniform temperature in the housing 11.

Fastened to the upper end of the exhaust stack 23 is an eductor unit 28 which may be of more or less standard design and include a blower (not shown) to create a forced draft in the exhaust flue 23. The force draft causes the air pressure in the interior of the housing 11 to drop below atmospheric so that primary and secondary air enters into the housing by induced draft. Draft in the flue 23 is controlled by a constant ratio draft regulator (not shown).

A combustion chamber or fire box 29 is mounted in the housing 11 and is formed as a weldment made from stainless steel or the like. The combustion chamber 29 includes a generally cylindrical body 31 closed at both ends by end plates 32 and 33. A substantially rectangular opening 34 is provided in the cylindrical body 31 between the end plates 32 and 33. The end plates 32 and 33 are each formed with axial square openings 35a which receive a complementary shaped hubs 35 and 36 of bearings 37 and 38 mounted on the front plate 14 and in the opening 26 of the bearing support structure, respectively, 24.

Disposed for rotation within the combustion chamber 29 is an agitator assembly 41 for rotating and agitating the wet sludge deposited thereon by the waste transfer device 18 and the dried partially incinerated waste in the combustion chamber 29 as more fully to be described hereinafter. The agitator assembly 41 includes a shaft 42 extending lengthwise through the combustion chamber 29 and journaled for rotation at each end in the bearings 37 and 38. The front end of the shaft 42 is connected to a motor 40 for rotation thereby. The intermediate 43 to the shaft 42 disposed between the combustion chamber end plates 34 and 33 is of rectangular cross section. Supported on the rectangular shaft section 43 is a rectangular tube 44 from which there projects a plurality of agitating arms 45 and 45a. The agitating arms 45 and 45a are displaced at 90° relative to each other and the wall of the combustion chamber to provide a grate surface on which the waste sludge is initially deposited prior to dropping on the wall of the combustion chamber 29.

Mounted on the top wall 16 and extending through an opening 46 is a burner assembly 47 which may be either a fuel or gas-fired burner. The burner assembly 47 is mounted at an inclined axis which intersects the combustion chamber 29 intermediate the ends thereof. In this manner uniform heating of the combustion chamber 29 is assured and the high temperature portion of the flame is directed into the waste material to be incinerated. Preferably, the burner assembly 47 is hingedly supported on the top wall to permit access through the opening 46 so that a vacuum tool may be inserted into the combustion chamber 29 for removal of ash.

In practicing the method of the present invention with the foregoing incinerator 10, the burner assembly 47 is ignited and the interior of the housing is preheated until the exhaust temperature reaches between about 1200° F. and 1900° F. This range of exhaust temperature insures that all noxious odors emanating from the wet sludge or waste will be oxidized and thus will not be released into the atmosphere. Moreover, preheating results in a uniform heating of the entire incinerator 10 thus minimizes the creation of a deleterious thermal gradient in the structure. Also the preheating imparts heat energy into the structure so that this stored heat energy is available to assist the heat from the burner flame to quickly raise the temperature of the wet waste material introduced into the combustion chamber. After preheating of the incinerator sewage solids which are in the form of a glutinous mass are fed into the incinerator 10 by means of the waste transfer device 18. The rate of feed is controlled by the screw auger which is adjusted so that the waste feed rate approximates the burning rate of the waste.

The waste initially drops on the surfaces of the rotating arms 45 and 45a of the agitator assembly 41. Because of the glutinous nature of the waste material it drops in large masses which adhere to the blades 45 and 45a so that only a minor portion, if any, is deposited on the wall of the combustion chamber 29. The glutinous mass is therefore initially subjected to the high temperature of the agitator blades 45 and 45a and the high temperature of the flame of burner 47. As the glutinous mass rotates on the grate surfaces provided by the blades and 45 and 45a, the temperature of glutinous waste is rapidly raised so that is it transformed into a mixture of ash and partially incinerated waste.

The ash and partially incinerated waste now heated to a high temperature is no longer adherent to the blades 45 and 45a and drops to the bottom of the combustion chamber 29. However, because of the high temperature of the material deposited on the combustion chamber wall, no temperature gradient is developed therein so that the operating life of the incinerator is prolonged.

The waste material accumulated in the bottom of the combustion chamber 29 is disposed in the path of rotation of the agitator blades 45 and 45a whereby the material is mixed and crushed. The material which has not been converted to ash may again be picked up by the rotating blades 45 and 45a to be exposed to the burner flame at the location of maximum heat. The pieces of waste too large to pass between the blades 45 and 45a are tumbled and exposed to air thereby to promote the rapid oxidation thereof.

As the foregoing described burning or combustion process occurs waste is continuously being fed into the incinerator at a rate substantially commensurate to the rate at which the waste is being burned. Thus, the combustion rate is completely controlled so that it becomes merely a time function. This in contrast to the prior methods of waste incineration where both time and temperature were required to be controlled in order to avoid runaway combustion.

Thus by the present invention, the maximum temperature developed by the controlled combustion rate is correspondingly controlled to insure reliable incinerator operation and a prolonged service life.

We claim:

1. The method of incinerating glutinous waste mass in a combustion chamber defined by a wall having an opening through which said glutinous waste mass is deposited into said chamber, said method comprising preheating said combustion chamber to provide heat energy for rapidly raising the temperature of said glutinous waste mass, depositing said glutinous waste mass through the combustion chamber opening, maintaining said waste mass out of contact with the wall of said combustion chamber to partially incinerate said mass for subsequent deposition of partially incinerated mass on said combustion chamber wall and continuing said incineration until said waste is converted to ash.

2. The method as defined in claim 1 wherein said glutinous waste mass is exposed to a burner flame while maintained out of contact with the combustion chamber wall.

3. The method as defined in claim 1 wherein said combustion chamber is preheated to a temperature between about 1,200° F. to 1,900° F.

4. The invention as defined in claim 2 wherein said glutinous mass is rotated in the presence of said combustion chamber heat and said burner flame while maintained out of contact with said combustion chamber wall until said glutinous waste mass is partially incinerated and the temperature is raised sufficiently to preclude the formation of a thermal gradient when deposited on the combustion chamber wall.

5. The method as defined in claim 4 wherein said glutinous mass is deposited on a metal grate formed by a plurality of spaced arms.

6. The invention as defined in claim 5 wherein said arms are arranged so that alternate ones are disposed substantially normal to the remaining arms so that said partially incinerated mass may drop between said arms on to the combustion chamber wall.

7. The invention as defined in claim 6 wherein said partially incinerated waste deposited on the combustion wall is agitated simultaneously with the glutinous mass deposited on said grate.

8. The invention as defined in claim 4 wherein said glutinous waste is deposited in said combustion chamber at a rate commensurate with the burning rate of said waste.